United States Patent [19]
Follett

[11] 3,862,641
[45] Jan. 28, 1975

[54] HEAT AND FLOW SENSITIVE SAFETY SHUT-OFF VALVE

[76] Inventor: John L. Follett, 14554 Richmond Ave., Fair Haven, N.Y. 13064

[22] Filed: Mar. 7, 1973

[21] Appl. No.: 338,884

Related U.S. Application Data

[63] Continuation-in-part of Ser. Nos. 257,655, May 30, 1972, , and Ser. No. 322,735, Jan. 11, 1973, , and Ser. No. 322,759, Jan. 11, 1973.

[52] U.S. Cl. .................... 137/75, 137/519, 137/546
[51] Int. Cl. ............................................. F16k 17/38
[58] Field of Search ............................. 137/72–77, 137/543.15, 457; 220/89 B

[56] References Cited
UNITED STATES PATENTS

| | | | |
|---|---|---|---|
| 1,284,877 | 11/1918 | Connor | 137/75 |
| 1,489,326 | 4/1924 | McMasters | 137/75 |
| 1,938,967 | 12/1933 | Lovekin | 137/75 |

Primary Examiner—Martin P. Schwadron
Assistant Examiner—Richard Gerard
Attorney, Agent, or Firm—Charles S. McGuire

[57] ABSTRACT

Valve biased to close by weight or spring, or closed by resilient means, each held inactive in absence of an unsafe predetermined temperature, with one form also actuatable to closed position by flow in excess of a predetermined rate, the valve being resettable to restore flow only when closed by excess flow or tremors.

7 Claims, 10 Drawing Figures

3,862,641

3,862,641

HEAT AND FLOW SENSITIVE SAFETY SHUT-OFF VALVE

REFERENCE TO RELATED APPLICATIONS

This is a continuation-in-part of co-pending applications Ser. No. 257,655 filed May 30, 1972, and Nos. 322,735 and 322,759 filed Jan. 11, 1973 of the same inventor.

BACKGROUND OF THE INVENTION

This invention relates to valves in general and more particularly to an improved shut-off valve.

In U.S. Pat. No. 3,407,827 granted to me, Oct. 20, 1968, a shut-off valve closing in response to excess flow employing an annular magnetic valve seat, and a movable valve element, such as a ball disposed in the path of flow, and movable by excess flow, vibration, or upset sufficiently close to the magnet as to be attracted to and seated, to close off flow, until reset after restoration of safe condition. As more fully disclosed therein, the valve is effective when used with portable heating units to prevent fires, due to upset or a broken gas line.

The present invention is directed to a valve sensitive to overheating and adapted to permanently close off the supply of gas in a fool proof, not resettable manner should it be exposed to an unsafe temperature condition. The invention in one form is also adapted to respond to excess gas flow and serious tremors, such as caused by earthquakes, and when closed in response thereto, the valve is resettable when conditions are restored to normal.

SUMMARY

The valve of this invention provides for permanent shut off when activated by an unsafe predetermined temperature rise, and the modified valve also provides for permanent shut off when temperature activated, but is resettable when activated by excess flow, or tremors, and other causes not due to unsafe temperatures.

The valves are adapted to be employed in gaseous fuel supply lines, and the like to act as safety devices to shut off flow when an unsafe condition arises, thus to prevent a gas line from fueling the fire of a burning building, or supplying an explosive atmosphere to a disaster area.

It is a principal object of this invention to provide a novel and improved thermally responsive shut-off valve that is tamper proof.

Another object is to provide a safety valve having a biased element for closing the valve having a temperature sensitive release, which when released is non-resettable.

A further object is to provide a safety valve having a biased element for closing the valve in response to a predetermined temperature rise, that is tamper proof and non-resettable, with provision for valve closure in response to a flow rate in excess of normal that may be reset to restore flow when the abnormal condition has been corrected.

A yet further object is to provide a safety valve satisfying the foregoing objects, and also subject to closure upon the occurrence of severe tremors, and which may be reset upon termination of the valve closing disturbance.

The valve comprises a valve head and seat, which is retained against closing by restraining a compressed coil spring or the weight of the valve through a heat fusible connection from acting to close the valve. The resilient means may directly act in response to temperature to close the valve, or act upon a valve member otherwise free to move in response to excess flow or tremors, or temperature release of the resilient means, the valve being not resettable upon a temperature release.

DETAILED DESCRIPTION

Figure 1:
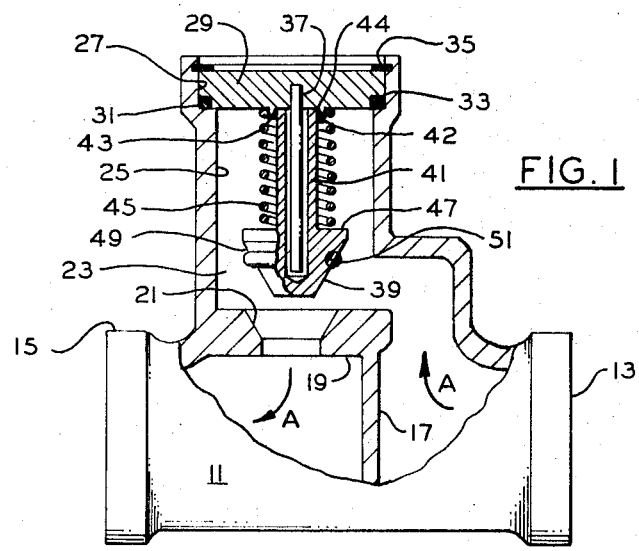
FIG. 1 is a front elevation partly in section, of a preferred form.

In the drawings, there is shown in FIG. 1 a valve body 11 having a pipe thread inlet indicated at 13 and an aligned pipe threaded outlet 15. The valve body has a dividing wall 17 and a valve seat wall 19, the latter having a conical valve seat 21, aligned with an upstanding valve chamber 23, defined by a cylindrical wall, 25, if desired, and a circular shouldered recess 27 into which is positioned an end closure member 29, the latter having an O ring seal 31 set in an annular corner groove 33. The end member 29 may be secured in place as by a lock ring 35, which may be of a type requiring special tooling for removal to prevent access to the valve by lay persons or the end closure may be press fitted and staked in place to provide a throw-away type, once the valve has performed its safety function.

The end closure 29 is provided with a central guide pin 37 on which is slidably centered a conical valve head 39, having an integral tubular stem 41. The end member 29 is provided with an annular ridge 42 having an internal diameter surface 43 forming a close fit to the exterior of the stem 41. The stem and surface 43 are soldered as at 44.

Prior to securing the stem 41, to the ridge wall 43 by solder, a coil spring 45 is disposed about the stem; having one end centered about the ridge 41, and the other end bearing against the surface 47 of the valve head 39. The spring is sufficiently compressed when the stem is soldered to the ridge wall 43, as to cause the valve head to seat upon the valve seat 21, and hold the same in closed position, when the soldered connection becomes fused. The valve head may have an annular groove 49 with an O ring 51 to facilitate the sealing action. The solder at the connection ridge wall 43 and stem 41 may have any desired alloyed constituents so as to permit melting at any desired temperature, such as 203°F, as an example.

The valve, when inserted in a gas line, for example, ahead of a gas meter will be actuated, when subjected to a temperature sufficient to cause the melting of the solder, whereupon the spring 45 expands and closes the valve. If the end closure 29 be press fitted into the valve body, the valve may be of the throw-away type, once the solder joint has been melted, due to exposure to an unsafe temperature situation.

Figure 3:
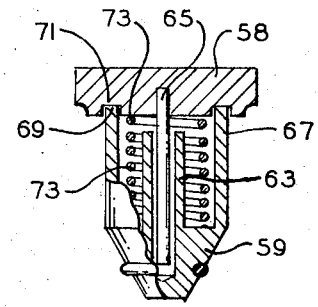

In FIG. 3, a modified end closure member 58 and valve structure is shown, wherein the conical valve head 59 is provided with an integral guide sleeve, 63 slidable on a guide pin 65 fixed in the member 58. The head also has an external integral sleeve 67 the end 69 of which is disposed in an annular groove 71 in the end member 58. A coil spring 73 within the sleeve 67 is held under compression when the end 69 is disposed in the groove 71, and held by a ring of solder. The solder, as before, will be selected so as to soften at a predetermined temperature to release the valve head to close the valve.

The valve head assembly of FIG. 3 is interchangeable with that shown in FIG. 1, and has the advantage of sealing off the spring to protect it from contamination or oxidation over a long period of time.

Figure 2:
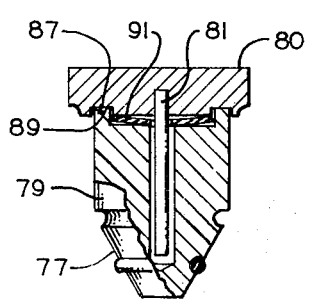
FIGS. 2, 3 and 4 are alternative sectional views of valve assemblies that may be employed in FIG. 1.
Figure 4:
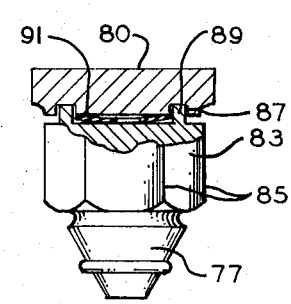

In FIGS. 2 and 4, gravity operated valve assemblies are shown, and when employed as a substitute for the assemblies shown in FIGS. 1 and 3, the valve body 11 is required to be installed with the chamber 23 disposed in a substantially vertical position, above the pipe line.

In FIG. 2, the conical valve head 77, is provided with a cylindrical weight portion 79 slidable on a guide pin 81 affixed in the circular end closure member 80, whereas in FIG. 4, the pin 81 is eliminated, and the weight portion 83 is of hexagonal shape to provide six guide edges 85 which slidably guide the member within the chamber, 23 whose internal wall 25 is cylindrical to slidably engage the guide edges 85.

Each of the weight portions 79 and 83 are provided with an annular rim 87 adapted to be soldered in an annular groove 89 of the end closure member 80, the solder having a melting point preselected as desired to provide release of the weight by melting upon the temperature reaching an unsafe value. Each of the weight portions 79 and 83 may be provided with a spring washer of the bellville type, which is held flat, when the portions 79 and 83 are soldered in place, the washer, being flattened under compression assures movement of the valve sufficiently to completely release the valve on melting of the solder, thus permitting the valve to seat and cut off flow. Flow, being as indicated by the arrows A in FIG. 1, assists the seating of the valve.

Figure 5:
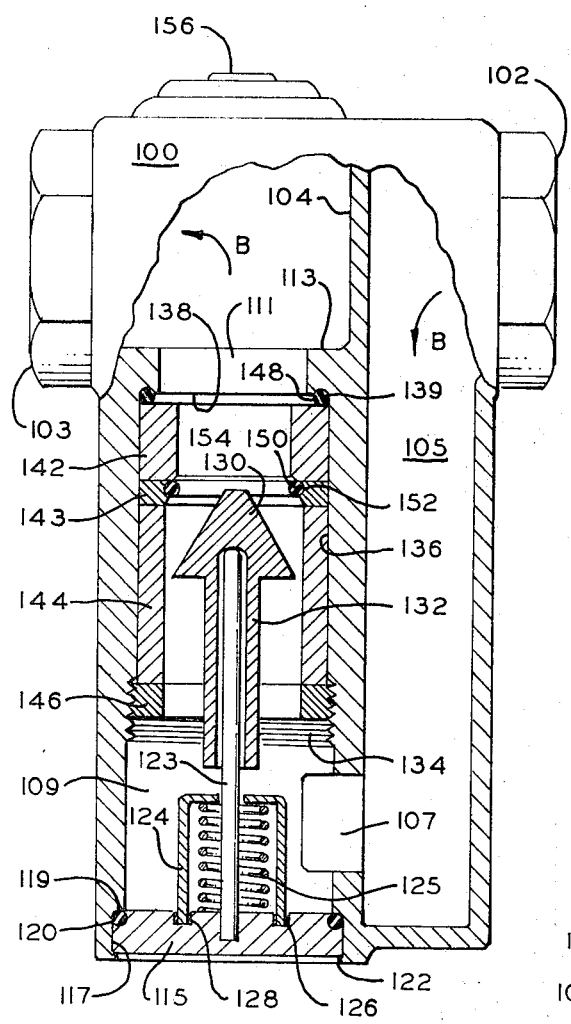
FIG. 5 is a front elevation partly in section of a second preferred form having the basic feature of FIG. 1 combined with other safe guards.

In the modified form of FIG. 5, there is shown a valve body 100 having a pipe threaded inlet 102, and pipe threaded outlet 103, in alignment but blocked by partition 104, the inlet connecting with a side passage 105 leading to a side port 107 into a valve chamber 109. The valve chamber has an aperture 111 in the wall 113 leading to the threaded outlet 103. Flow is in the direction indicated by arrows B. The valve chamber has a circular end closure member 115 seated in an enlarged end bore 117, against an annular shoulder 119, and an O ring seal 120. The member is preferably a press fit, and once in place, the body wall may be stacked over as at 122 to prevent removal.

The end closure member is provided with a central guide pin 123 on which is positioned a thimble like sleeve 124 of an internal diameter sufficient to contain a coil spring 125 under compression, and the lower circular end of the sleeve is seated in an annular recess 126 and soldered in place as at 128, with the spring under compression.

Disposed slidably on the upper end of the guide pin is a conical valve 130 member having a tubular guide stem 132 freely slidable on the pin 123. The valve chamber is provided with internal threads 134, and a smooth bore 136 leading to the wall 113. The underface 138 of the wall is finished, and provided with an annular O ring recess 139.

An annular magnetic ring 142 is held in place by valve seat ring 143, a sleeve 144, and annular threaded member 146, the upper end of the magnet abutting the O ring 148 in recess 139. The sleeve 144 has an internal bore of a diameter, in relation to the bore diameter of the conical valve element 130, whereby to cause upward movement of the valve member upon a predetermined excessive rate of flow of gas upward through the chamber 109, the valve member 130 normally resting on the end of guide rod 123. The lifting of the valve member by excess flow will cause the valve member, which is of magnetic material such as stainless steel 416, to move sufficiently close to the permanently magnetized ring 142, so as to be attracted and lifted upward into engagement with an O ring 150 seated in an annular internal offset recess 152 in the valve seat ring 143, where it will be held by magnetic attraction. The inside diameter of the magnetized ring 142 in less than the diameter of the valve 130, and the lower inside annular corner may have an annular chamber 154 which may also act as a seat for the valve 130, should the O ring not be employed, or be destroyed by heat.

The valve may be unseated and returned to its rest position on the end of the guide pin, by removing the plug 156 and projecting a rod into the valve chamber against the seated valve, to force it away from the magnetic attraction into a sphere sufficiently distant from the magnet, whereby the weight of the valve overcomes the magnetic field strength, and rests by gravity on the head of the pin 123.

Should the valve body 100, or particularly its end closure member 115 be subjected to heat, sufficiently to raise its temperature to the melting point of the solder annulus in groove 126, holding the thimble like sleeve in the position shown, the sleeve 124 will be released and driven upward by the compressed coil spring 125, to engage the tubular valve stem 132, and lift the valve to its O ring seat 150, where the valve will be held in position by magnetic attraction, and compression of the spring 125 as well, if desired. When this happens, the valve cannot be reset by the insertion of a rod into the opening, since the spring will hold the valve sufficiently close to, or in engagement with the O ring seat 150, as soon as the reset rod is removed. Thus the valve will have to be removed, and preferably discarded, and a new valve installed.

Figure 7:
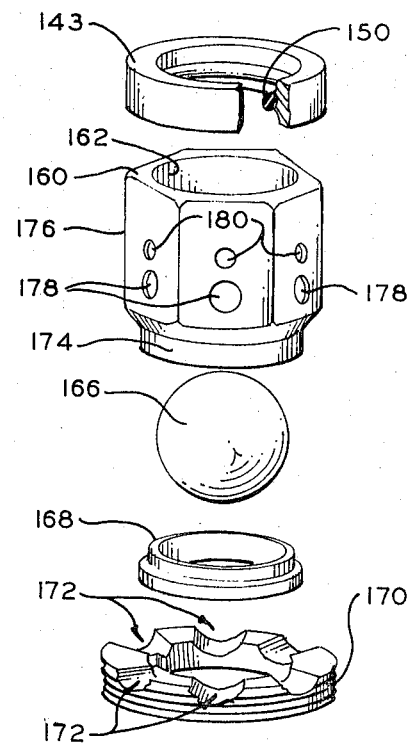
FIG. 7 is an exploded view of the valve elements of FIG. 6.
Figure 6:
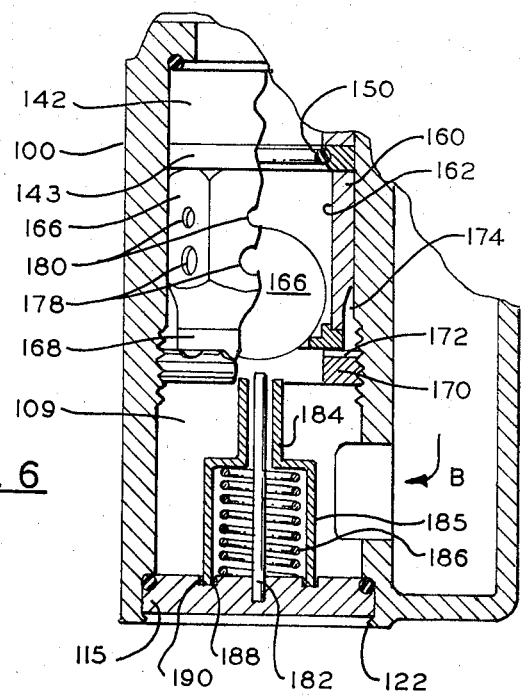
FIG. 6 is a fragmented sectional view of a valve similar to FIG. 5, with alternative valve assembly.

If desired, a spherical ball of magnetic material may be employed in place of the conical valve, in a cage like assembly such as is illustrated in FIGS. 6 and 7, wherein, below the magnet 142, there is disposed a seal ring 143 having an O ring 150, a sleeve 160 having an internal cylindrical bore 162 and exterior of hexagonal configuration as indicated at 164. Disposed within the bore 162 is a magnetic ball 166, resting on a ball support ring 168, the ring being held in position by a threaded annular member 170.

The diameter of the ball 166 in reference to the diameter of the bore 162 are such as to allow the ball to rest on its seat during normal flow of gas through the valve chamber 109, flow normally entering ring 170, and flowing radially through ring grooves 172 into the annular space formed by the annular offset 174 leading to the cavities formed by the hexagonal flats 176 and bore 162, which flats are provided with one or more ports 178 and 180 above the center of the ball 166, so that the ball may rest on the ring 168 without movement, during normal flow.

In order to cause the valve to close in response to a dangerous temperature condition, the end member 115 is provided with a guide pin 182 on which is slidably mounted the integral sleeve 184 of a thimble 185, the thimble 185 enclosing a coil spring 186, held in compression by the thimble 185 the lower edge of which is soldered in place in an annular groove 188, the solder 190 being preselected to melt at a given temperature. It will be seen that when the solder 190 fuses the spring 186 will be released, and the sleeve 184 will engage the ball 166 and lift the ball sufficiently close to the magnet 142 as to cause the ball to seat on the O ring 150 and close the valve. Should the ball seat on the O ring 150, due to an excess flow rate, the ball may be returned to its rest by removing the plug 156, and inserting a rod to push the ball away from the magnet, as in the case of the conical valve of FIG. 5.

If desired, the magnetized ring 142 in FIG. 6 may be eliminated, and the member 143 made somewhat thicker axially to form a valve seat for the ball, the ball being held in place by differential pressure alone. In this case the ball need not be of magnetic material. This may also apply to the conical valve 130.

Figure 8:
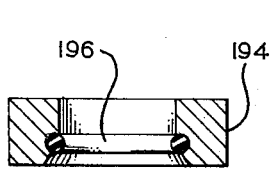
FIGS. 8, 9 and 10 are sectional views of variations possible in several of the valve elements.
Figure 9:
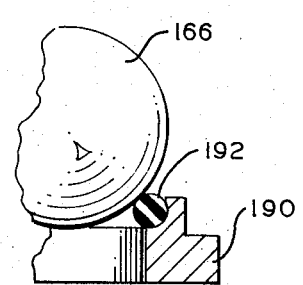
Figure 10:
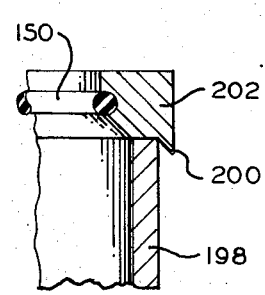

In FIG. 9, a modified rest 192 is shown wherein an O ring 192 forms the rest for the ball. In FIG. 8, the ring 148 and magnet 142 are combined in one magnetic piece 194, having the O ring seal 196 positioned in a suitable annular groove. In FIG. 10, a plain cylindrical tubular member 198 of lesser diameter than the bore 136, replaces the self centering hexagonal member 176. The member 198 is centered by an external flange 200 in the member 202, which is provided with O rings 150, the member replacing the ring 148. The tubing 198, like the hex member 176 may have a plurality of ports corresponding to ports 180 and 178, so that normal flow will not lift the ball from its rest, and cause flutter.

The size and number of the openings, or ports in the tube surrounding the ball closure elements as well as the relative positions of the openings and ball, when the latter is resting on its support, are determinative of the flow rate required to effect valve closure. It is important to note that the ball will move to the closed position when the flow rate reaches or exceeds the predetermined limit. Valve operation may be controlled within very close tolerances of flow rate, and is extremely repeatable within the same tolerances.

In FIGS. 5 and 6, it will be observed that the passage 105 extends below the side port 107 to form a dirt trap. While solder has been referred to as a heat sensitive release means, it will be apparent that other substances such as resin, epoxy glue, beeswax and the like could be employed, it only being necessary that the material employed securely holds the closing element in inactive position, and releases the element only upon the occurrence of the predetermined unsafe condition.

If the holding feature of the magnet is not desired, the valve 130 in FIG. 5 could cooperate with a seat in the wall 113, and eliminate the parts employed to retain the magnet.

It will be appreciated that an electric heating element may be applied to outside of the closure member 115, with connections leading to a point where application of power to the connections would heat the valve closure member 115 sufficiently to trip the valve, as an emergency feature.

What is claimed is:

1. An automatic shut-off valve operable to seal off the flow in a fluid supply line in response to an unsafe condition, said valve comprising in combination:
   a. a valve body having inlet and outlet openings with a fixed valve seat therebetween;
   b. a movable closure element normally spaced from the seat to allow flow therethrough and movable to bring one end thereof into engagement with said seat to block flow in response to an unsafe condition;
   c. means defining a hollow recess extending into the end of said closure element opposite said one end;
   d. a fixed guide element extending into said recess in close proximity to the wall thereof to define the path of movement of said closure element from said spaced to said blocking positions; and
   e. means forming a seal around the entire periphery of said recess isolating said guide element from matter outside said recess;
   f. said sealing means comprising a fusible connection, releasable in response to an unsafe condition to permit movement of said closure element from said spaced to said blocking position.

2. The invention according to claim 1, wherein said guide element comprises an elongated pin extending from an anchored connection to a base portion of said valve body to which said closure element is connected by said sealing means.

3. The invention according to claim 2, wherein said base portion comprises a plug fitted into an opening in a surrounding portion of said valve body.

4. The invention according to claim 3, wherein said base portion is permanently, press-fit connected to said surrounding portion.

5. The invention according to claim 1, and further including a spring disposed wholly within said recess, and thereby isolated from matter outside said recess, biasing said closure element toward said blocking position.

6. The invention according to claim 1, and further including a second, annular recess surrounding a sleeve portion of said closure element containing said hollow recess into which said guide element extends, said sealing means extending around the periphery of said second recess, and a spring disposed wholly within said second recess.

7. The invention according to claim 1, wherein said fusible connection is solder which is in a molten state to form said sealing means and solidified to maintain said closure element in said spaced position.

* * * * *